(12) United States Patent
Blücher et al.

(10) Patent No.: US 7,001,114 B2
(45) Date of Patent: Feb. 21, 2006

(54) DEVICE FOR CHIP REMOVING MACHINING

(75) Inventors: Mats Blücher, Fagersta (SE); Jonas Boman, Falun (SE); Thomas Eriksson, Falun (SE); Jan-Olf Lundeqvist, Fagersta (SE); Kaj Virtanen, Vasteras (SE)

(73) Assignee: Seco Tools AB, Fagersta (SE)

( * ) Notice: Subject to any disclaimer, the term of this patent is extended or adjusted under 35 U.S.C. 154(b) by 288 days.

(21) Appl. No.: 10/609,600

(22) Filed: Jul. 1, 2003

(65) Prior Publication Data

US 2004/0067112 A1 Apr. 8, 2004

(30) Foreign Application Priority Data

Jul. 1, 2002 (SE) .................................. 0202029

(51) Int. Cl.
*B23B 51/00* (2006.01)

(52) U.S. Cl. .................. 407/103; 407/48; 408/233

(58) Field of Classification Search ............. 407/103, 407/113, 48, 40, 102; 408/233, 231, 239 R
See application file for complete search history.

(56) References Cited

U.S. PATENT DOCUMENTS

| 5,810,518 | A | * | 9/1998 | Wiman et al. | ............... 407/102 |
| 5,863,162 | A | | 1/1999 | Karlsson et al. | |
| 5,931,613 | A | * | 8/1999 | Larsson | ..................... 407/103 |
| 6,146,060 | A | | 11/2000 | Rydberg et al. | |
| 6,241,433 | B1 | * | 6/2001 | Rydberg et al. | ............ 408/233 |
| 2002/0192042 | A1 | * | 12/2002 | Rydberg | ..................... 407/92 |
| 2003/0059264 | A1 | * | 3/2003 | Hansson et al. | ............... 407/66 |

FOREIGN PATENT DOCUMENTS

DE    34 48 086 C2    12/1991

* cited by examiner

*Primary Examiner*—Boyer D. Ashley
*Assistant Examiner*—Sara Addisu
(74) *Attorney, Agent, or Firm*—Burns, Doane, Swecker & Mathis, LLP

(57) ABSTRACT

An apparatus for chip removing machining includes first and second parts which are intercoupled by a coupling. The coupling includes two interacting surfaces disposed on the first and second parts, respectively. The interacting surfaces are profiled to intermesh with one another to define an intermeshing region of the coupling. Each of the surfaces is profiled with first and second sets of grooves which define first and second main directions, respectively, which extend transversely to one another. At least one groove on each of the surfaces extends across less than the entire intermeshing region, wherein the surfaces define only one coupling position for the first and second parts.

10 Claims, 3 Drawing Sheets

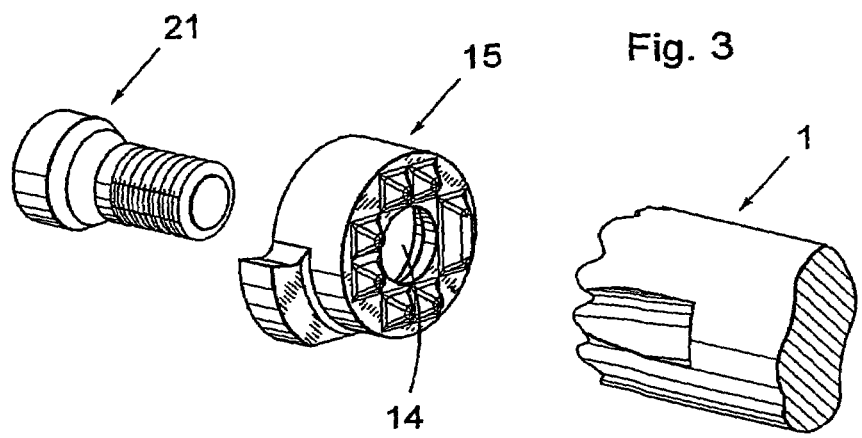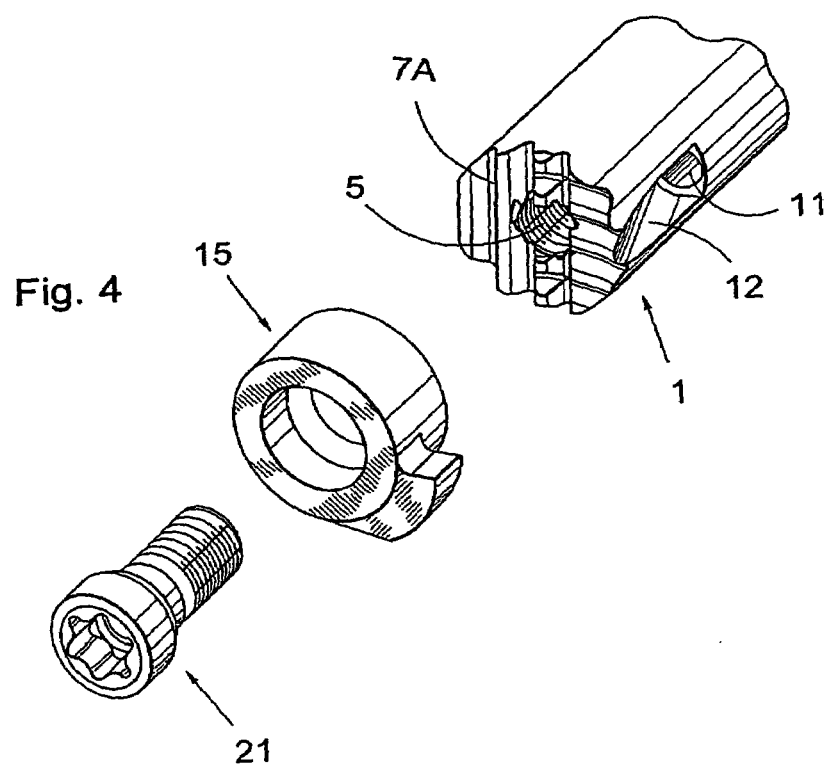

DEVICE FOR CHIP REMOVING MACHINING

This application claims priority under 35 U.S.C. §§ 119 and/or 365 to patent application Ser. No. 0202029-5 filed in Sweden on Jul. 1, 2002, the entire content of which is hereby incorporated by reference.

BACKGROUND OF THE INVENTION

The present invention relates to a coupling in tools for chip forming machining, wherein the coupling comprises two interacting surfaces and members for forcing the surfaces together, wherein the surfaces are profiled with grooves in order to enable form locking against each other, wherein each surface comprises at least two sets of grooves, wherein each set of grooves has a main direction, and wherein the main directions in the same surface extend transverse to each other. The invention also relates separately to a tool, a cutting head and a holder.

Through U.S. Pat. No. 6,146,060, a coupling in tools for chip forming machining is previously known, wherein the coupling comprises two interacting surfaces and members for forcing the surfaces together. The interacting surfaces are profiled with grooves in order to enable mutual form locking. Characteristic of the coupling according to U.S. Pat. No. 6,146,060 is that the interacting surfaces are arranged to comprise at least four separate positions in relation to each other.

Through DE-C2-34 48 086, a tool for internal turning is previously known, where the coupling between the cutting head and the holder comprises a surface having three radially extending bars and an interacting surface having three radially extending grooves. This means that the interacting surfaces may assume three separate positions in relation to each other. Another document of some interest is U.S. Pat. No. 5,863,162.

OBJECTS AND FEATURES OF THE INVENTION

One object of the present invention is to provide a coupling between two tool parts, which coupling may transfer a large torque at the same time as the tool parts only may assume one single position in relation to each other.

The object of the present invention is realized by an apparatus for chip removing machining which comprises a first part and a second part coupled to the first part by a coupling. The coupling comprises two interacting surfaces disposed on the first and second parts respectively. The interacting surfaces are profiled to intermesh with one another to define an intermeshing region of the coupling. A clamp member is provided for forcing the surfaces together. Each of the surfaces is profiled with first and second sets of grooves which define first and second main directions, respectively. The first and second main directions extend transversely to one another. At least one groove on each of the surfaces extends across less than the entire intermeshing region, wherein the surfaces define only one coupling position for the first and second parts.

The invention also pertains to a cutting head for chip removing machining which comprises a surface profiled with grooves to define an intermeshing region adapted to intermesh with a grooved surface of a holder. The grooves comprise at least first and second sets of grooves which define first and second main directions, respectively. Those first and second main directions extend transversely to one another. At least one groove extends across less than the entire intermeshing region.

The invention also pertains to a holder for chip removing machining which comprises a surface that is profiled with grooves that define an intermeshing region adapted to intermesh with a grooved surface of a cutting head. The grooves comprise at least first and second sets of grooves which define first and second main directions, respectively. Those first and second main directions extend transversely to one another. At least one groove extends across less than the entire intermeshing region.

BRIEF DESCRIPTION OF THE DRAWINGS

Below, embodiments of the invention will be described, wherein reference is made to the appended drawings.

FIG. 3 shows an exploded view in perspective of a tool according to the present invention.

FIG. 4 shows an exploded view in perspective, in another angle than FIG. 3, of a tool according to the present invention.

DESCRIPTION OF PREFERRED EMBODIMENTS OF THE INVENTION

Figure 1:
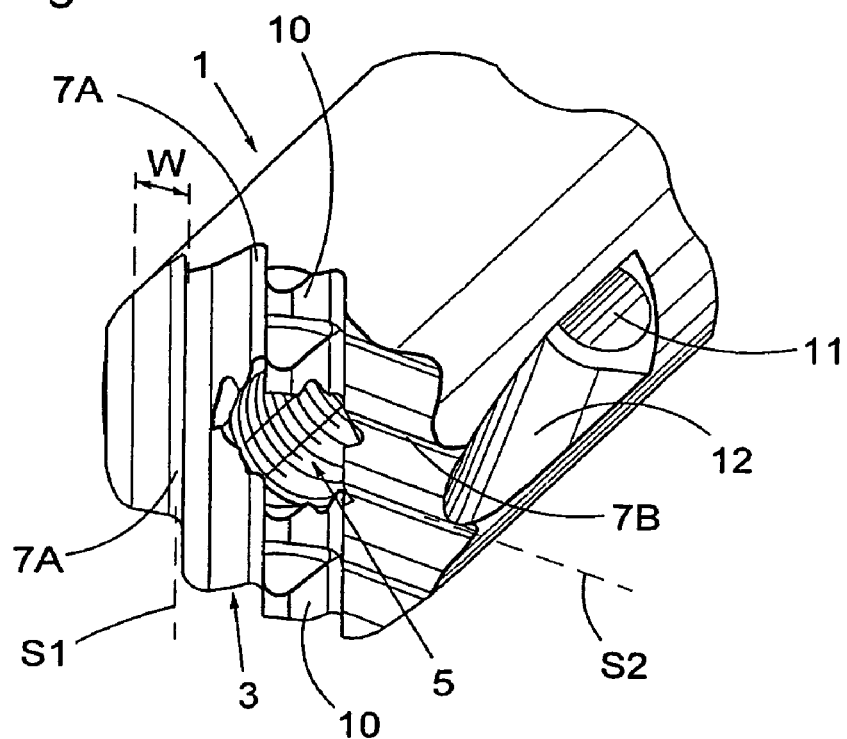
FIG. 1 shows a perspective view of the part of a holder according to the present invention that comprises a connecting surface.

The holder 1 shown in FIG. 1 may, for instance, be manufactured from steel or cemented carbide. The free end of the holder 1 shown in FIG. 1 comprises a front surface 3 and a threaded hole 5. The front surface 3 has a circular basic shape and comprises two sets of grooves 7A and 7B, respectively. Each set of grooves 7A and 7B, respectively, covers generally half the front surface 3 and comprises a number of identical spaced-apart female members or grooves (channels) 7A and 7B, respectively. The first grooves 7A have a first main direction S1 and the second grooves 7B have a second main direction S2, which main directions S1 and S2 are perpendicular to each other. The two sets of grooves 7A and 7B adjoin each other and overlap each other. Each first groove 7A in the first set intersects the envelope surface of the holder 1 in two regions while each second groove 7B in the second set of grooves intersects the envelope surface of the holder 1 in one region. Thus, as will become apparent, the grooves 7B extend across less than an entire intermeshing region defined between the holder and a cutting head. Each groove 7A and 7B has a maximum width W and in absolute measurements, the groove has a width of 0.2 mm, preferably approx. 1.5 mm. Each groove has two flanks, which via a sharp or rounded transition connect to a bottom. The angle is within the interval 40°–80°, preferably 55°–60°. As for the more detailed design of the cross-section geometry of the grooves, reference is made to relevant parts of the description belonging to U.S. Pat. No. 6,146,060.

In the embodiment shown in FIG. 1, the first set of grooves 7A has been manufactured by slab milling or grinding, the feeding direction being parallel with the first main direction S1. Then, the second set of grooves 7B has been machined with the same tool in a direction parallel with the second main direction S2. In order to obtain full depth in each groove 7B of the second set of grooves 7B, it is convenient that the tool is fed a distance into the first set of grooves 7A. Thereby, the tool will also machine material that is included in the first set of grooves 7A, which is seen in FIG. 1, wherein entirely or partly pyramid-shaped male members or first tips 10 are formed in the termination of the second set of grooves 7B in the first set of grooves 7A. In the embodiment according to FIG. 1, the first set comprises three grooves 7A, while the second set comprises four grooves 7B. The arrangement of first and second sets of grooves 7A and 7B in the front surface 3 involves a significantly larger specific surface than if this surface would have been planar. The grooves that are aligned with the hole 5 are machined into, i.e., they intersect, the hole, as shown in FIG. 1.

The holder 1 according to FIG. 1 also comprises a channel 11 for cooling medium, wherein this channel 11 mouths in a countersink 12 of the holder 1. The significance of the location of the cooling channel 11 in the holder 1 will be explained in the description below.

Figure 2:
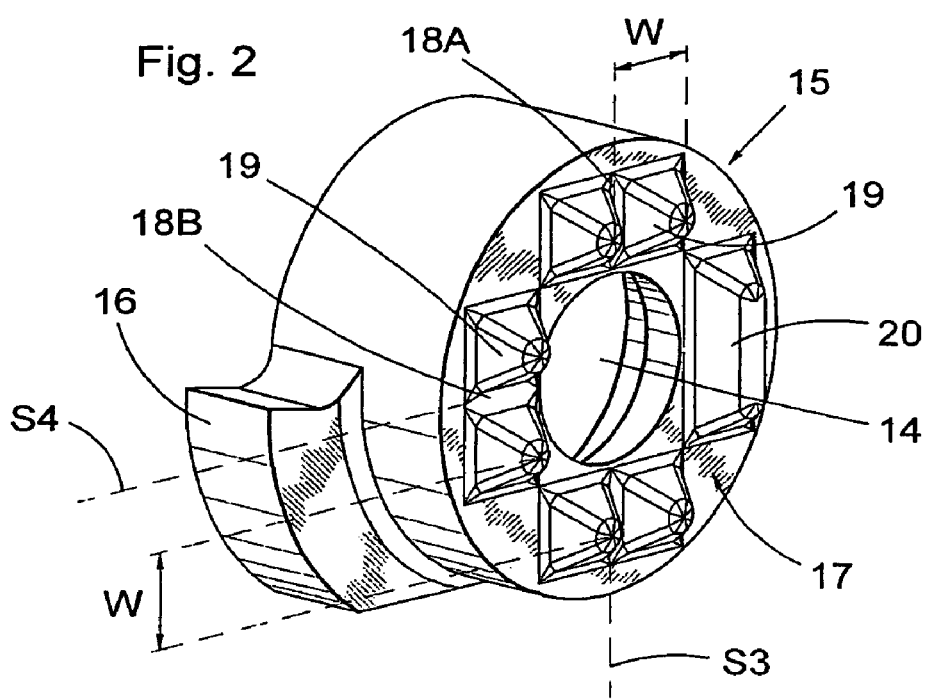
FIG. 2 shows a perspective view of a cutting head according to the present invention.

The cutting head 15 according to the present invention shown in FIG. 2 is preferably intended to be used at internal turning. The cutting head 15 may, for instance, be manufactured from cemented carbide, cermet or high speed steel. The cutting head 15 is generally circular cylindrical with an edge portion 16 that extends radially beyond the rest of the cutting head 15. The edge portion 16 is in the conventional way provided with rake faces and flank surfaces. The cutting head 15 is also provided with a through-going central hole 14, which is intended to interact with a locking screw, see below.

The cutting head 15 is provided with a support surface 17, which generally has a circular shape and comprises a third and a fourth set of grooves. The third set comprises a number of third grooves 18A having a third main direction S3, while the fourth set comprises a number of fourth grooves 18B having a fourth main direction S4, which main directions S3 and S4 are perpendicular to each other and perpendicular (technically, orthogonal to the center line). In the shown embodiment of the cutting head 15, three third grooves 18A and three fourth grooves 18B are arranged. Since the third and fourth main directions S3 and S4 generally intersect each other, entirely or partly pyramid-shaped second tips 19 are formed, however with a certain exception according to the principle of the present invention. This will be more thoroughly elucidated below. As for the cross-sectional geometry of the third and fourth grooves, 18A and 18B, reference is made to what has been described above concerning the first and second grooves 7A and 7B. The arrangement of third and fourth sets of grooves 18A and 18B in the support surface 17 involves a significantly larger specific surface than if this surface would have been planar. The cutting head 15 according to FIG. 2, with the third and fourth sets of grooves in the support surface 17, may for instance be manufactured by direct pressing or injection molding and subsequent sintering. As for the sets of grooves, these may also be produced by means of grinding.

In the embodiment illustrated of the cutting head 15, the mutual positioning of the components belonging to the cutting head 15 is such that an imaginary plane that extends in the axial direction, through the center of the hole 14 and in the fourth main direction S4 intersects the edge portion 16, the groove 18B, as well as an elongate ridge 20.

The provision of grooves in both of the surfaces 3, 17 enables those two surfaces to intermesh with one another to define an intermeshing region. An exceptionally important feature for the groove configuration of the cutting head 15 is that the middle groove 18B in the fourth main direction S4 only extends across a part of the support surface 17, which more generally may be expressed as that at least one groove in one of the sets of grooves 18B extends across only a part (i.e., less than the entire) of the support surface 17. This entails that an elongate ridge 20 is formed, which is not penetrated by the middle groove 18B in the set of grooves that has the fourth main direction S4. The ridge 20 constitutes a stop in the groove 18B. An imaginary extension line of the ridge extends offset or spaced from the longitudinal central axis of the tool. The making of the elongate ridge 20, which has the maximum extension thereof in the third main direction S3, entails that the cutting head 15 may only be mounted in one way in the holder 1, which is realized by studying the groove configuration for the front surface 3 of the holder 1. Thus, the surfaces 3, 17 define only one coupling position for the cutting head and the holder.

It will thus be appreciated that the tips 19 and the ridge 20 can be considered as being raised with respect to the adjacent grooves. Due to the elongation of the ridge 20 as compared to the shorter tips 19, the raised portions are arranged asymmetrically about the axis of the hole 14.

Figure 5:
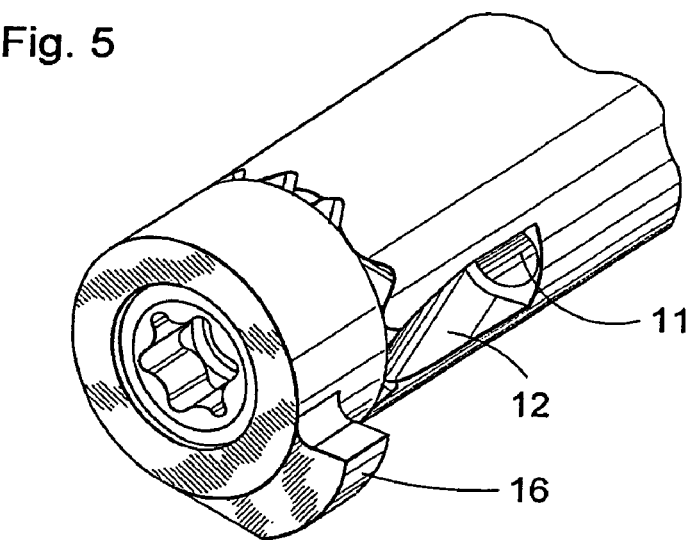
FIG. 5 shows a perspective view of a tool according to the present invention, where the parts included in the tool are interconnected.

In order to illustrate the assembly of the cutting head 15 on the front surface 3 of the holder 1, reference is made to FIGS. 3–5. As is seen in these figures, the cutting head 15 is fixed in relation to the holder 1 via a locking screw 21, which extends through the through-going hole 14 of the cutting head 15 and into the threaded hole 5 of the holder 1. As is seen in FIG. 4, the cutting head 15 is provided with a step or the like, in connection with the through-going hole 14, for interaction with a head of the locking screw 21.

When the support surface 17 of the cutting head 15 is brought into contact with the front surface 3 of the holder 1 (whereby the surfaces 3, 7 constitute interactive surfaces), the elongate ridge 20 of the cutting head 15 is to be received in the first groove 7A that is positioned farthest out, which extends in the first main direction S1. By observing the groove configurations of the front surface 3 and the support surface 17, it is realized that the only place where the elongate ridge 20 may be received is in the first groove 7A positioned farthest out in the first set of grooves. Thereby, the risk of the cutting head 15 being mounted in an incorrect position has been eliminated. In this connection, it should be mentioned that if the cutting head 15 is mounted in an incorrect position in relation to the holder 1, a tilting of the cutting head 15 in relation to the holder 1 will occur, which is so big that it is not possible for the locking screw 21 to enter the threaded hole 5 of the holder 1.

In FIG. 5, the cutting head 15 is shown in a mounted state on the holder 1. Since the cutting head 15 only may be mounted in a single predetermined position on the holder 1, it is possible to arrange the cooling channel 11 in such a way that cooling medium coming out from the same is directed towards the edge portion 16 of the cutting head 15. Thereby, the possibilities are improved for a satisfactory cooling of the cutting edge when the same performs chip removing machining of a workpiece.

Figure 6:
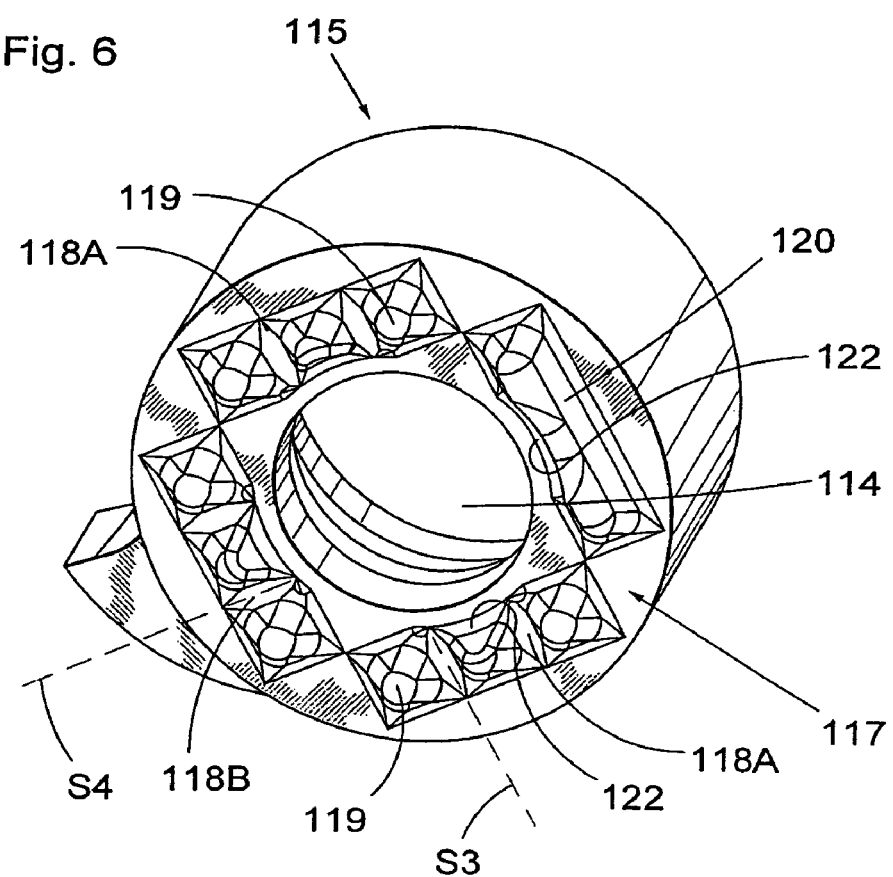
FIG. 6 shows a perspective view of an alternative embodiment of a cutting head according to the present invention.

The alternative embodiment of a cutting head 115 according to the present invention shown in FIG. 6 principally differs from the cutting head 15 according to the above by the number of grooves in each set that are arranged in the support surface 117 of the cutting head. Thus, each set of grooves 118A, 118B of the cutting head 115 comprises an additional groove in comparison with the cutting head 15. In a way corresponding to the cutting head 5, the sets of female members or grooves 118A and 118B have a main direction each, S3 and S4, respectively, which are perpendicular to each other. By the fact that the grooves 118A and 118B intersect each other, entirely or partly pyramid-shaped male members or tips 119 are formed, however with a certain exception according to the principle of the present invention. The two middle grooves 118B in the fourth main direction S4 extend across only a part of the support surface 117. This entails that an elongate ridge 120 is formed, which is penetrated by the middle grooves 118B in the set of grooves that has the fourth main direction S4. The making of the elongate ridge 120, which has the maximum extension thereof in the third main direction S3, entails that the cutting head 115 can only be mounted in one way in an appurtenant holder, having a groove configuration according to same principles as the holder 1, however fitting against the cutting head 115. An imaginary extension line of the elongated ridge 120 extends offset or spaced from the longitudinal central axis of the cutting head.

As is seen in FIG. 6, the pyramid-shaped tips 119 positioned closest to the hole 114 and the portion of the ridge 120 positioned closest to the hole 114 are provided with a recess 122, which is arranged for manufacturing-technical reasons since a certain amount of clearance is required around the hole 114.

Generally, it is valid for the tool according to the present invention and the components included in this tool that it preferably involves small dimensions. Thus, the diameter/across corner dimension for the tool/cutting head/holder is normally within the interval of 5–10 mm. The protrusion of the edge portion 16; 116 from the rest of the cutting head 15; 115 is normally within the interval of 2–5 mm.

Feasible Modifications of the Invention

In the embodiments described above, the elongate ridge 20; 120 is arranged on the cutting head 15; 115. This means that it is the cutting head 15; 115 which is in principle modified in comparison with the known technique that is described in U.S. Pat. No. 6,146,060. This means that the new cutting heads 15; 115 according to the present invention may in principle fit in a holder according to U.S. Pat. No. 6,146,060, which of course is an exceptionally great advantage. However, within the scope of the present invention, it is also feasible that the groove configurations swap locations, i.e. that the front surface of the holder is provided with an elongate ridge.

In the embodiments described above, the elongate ridge 20; 120 has been given a location on the cutting head 15; 115 as far away as possible from the edge portion 16; 116. However, alternative locations of the elongate ridge on the cutting head are also feasible within the scope of the invention. Thus, the elongate ridge may still have an extension in the third main direction S3 but be positioned closer to the edge portion 16; 116. The elongate ridge may also have an extension in the fourth main direction S4. It is generally valid that in a modification of the location of the elongate ridge on the cutting head 15; 115, a corresponding modification of the groove configuration on the front surface 3 of the holder 1 must be carried out. In case the elongate ridge is located on the front surface 3 of the holder 1, corresponding alternative locations are naturally feasible, wherein also in this case a modification of the groove configuration of the support surface of the cutting head is required.

Although the present invention has been described in connection with preferred embodiments thereof, it will be appreciated by those skilled in the art that additions, modifications, substitutions and deletions not specifically described may be made without departing from the spirit and scope of the invention as defined in the appended claims.

What is claimed is:

1. Apparatus for chip removing machining comprising a first part and a second part coupled to the first part by a coupling, wherein the coupling comprises two interacting surfaces disposed on the first and second parts, respectively, the interacting surfaces being profiled to intermesh with one another to define an intermeshing region of the coupling, a clamp member for forcing the surfaces together; each of the surfaces being profiled with first and second sets of grooves, the first and second sets defining first and second main directions, respectively, extending transversely to one another; at least one groove on each of the surfaces extending across less than the entire intermeshing region, wherein the surfaces define only one coupling position for the first and second parts.

2. The apparatus according to claim 1 wherein one of the interacting surfaces includes a ridge having a length in the first main direction which is larger than a groove width of the second set of grooves on the same interacting surface.

3. The apparatus according to claim 1 wherein the first and second main directions extend perpendicularly to one another.

4. The apparatus according to claim 1 wherein the first and second parts comprise a cutting head and a holder, respectively, wherein the cutting head carries a cutting edge.

5. The apparatus according to claim 4, wherein one of the surfaces includes a ridge having a length in the first main direction which is larger than a groove width of the second grooves of the same surface.

6. The apparatus according to claim 5 wherein the first and second main directions extend perpendicularly to one another.

7. A cutting head for chip removing machining comprising a surface profiled with grooves defining an intermeshing region adapted to intermesh with a grooved surface of a holder; the grooves comprising at least first and second sets of grooves defining first and second main directions, respectively, the first and second main directions extending transversely to one another, at least one groove of one of the sets extending across less than the entire intermeshing region; the cutting head including a through-hole extending through the surface and defining an axis; the surface including raised portions disposed adjacent the sets of grooves, the raised portions arranged asymmetrically about the axis.

8. The cutting head according to claim 7 wherein the at least one groove extends in the second main direction and extends up to a ridge extending in the first main direction, the ridge having a length in the first main direction which is longer than a groove width of the second grooves.

9. A cutting head for chip removing machining comprising a surface profiled with grooves defining an intermeshing region adapted to intermesh with a grooved surface of a holder; the grooves comprising at least first and second sets of grooves defining first and second main directions, respectively, the first and second main directions extending transversely to one another, at least one groove of one of the sets extending across less than the entire intermeshing region, wherein the at least one groove extends in the second main direction and extends up to a ridge extending in the first main direction, the ridge having a length in the first main direction which is longer than a groove width of the second grooves.

10. The cutting head according to claim 9 wherein the first and second main directions extend perpendicular to one another, the ridge being offset from a center axis of the cutting head.

* * * * *